(No Model.)

J. CLARK.
TOE WEIGHT FOR HORSES.

No. 431,802. Patented July 8, 1890.

Witnesses:
John R. Pettenstrom
Jean Elliott.

Inventor:
John Clark
By Buxton & Buxton
Attorneys

THE NORRIS PETERS CO., PHOTO-LITHO., WASHINGTON, D. C.

UNITED STATES PATENT OFFICE.

JOHN CLARK, OF CHICAGO, ILLINOIS.

TOE-WEIGHT FOR HORSES.

SPECIFICATION forming part of Letters Patent No. 431,802, dated July 8, 1890.

Application filed December 13, 1888. Serial No. 293,460. (No model.)

*To all whom it may concern:*

Be it known that I, JOHN CLARK, a citizen of the United States, residing at Chicago, county of Cook, and State of Illinois, have invented certain new and useful Improvements in Toe-Weights for Horses, which are fully set forth in the following specification.

Figure 1:
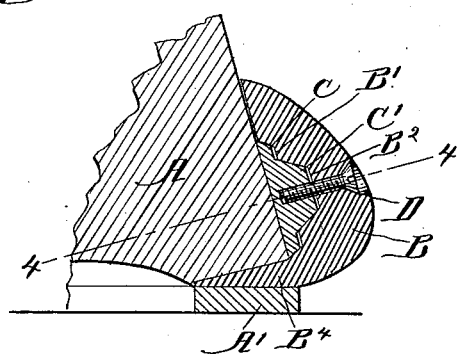
Figure 2:
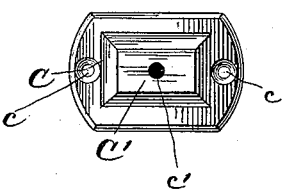
Figure 3:
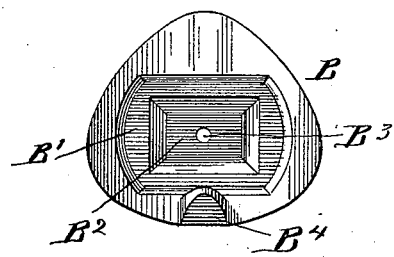
Figure 4:
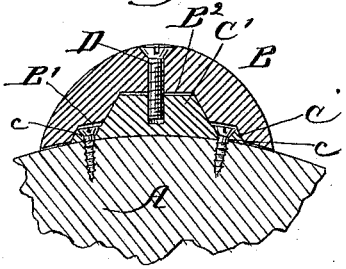
Figure 5:
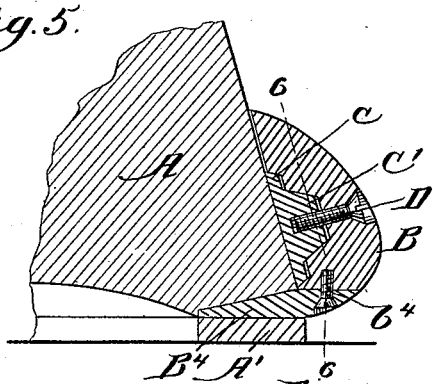
Figure 6:
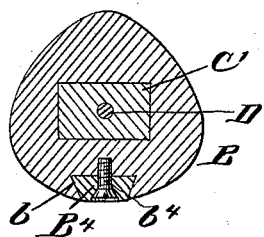
Figure 7:
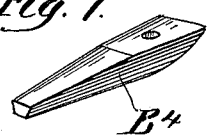

In the drawings, Figure 1 is a vertical section from front to rear through a horse's hoof having my toe-weight attached. Fig. 2 is a front elevation of the plate to which the weight is secured. Fig. 3 is a rear elevation of the weight itself removed from the hoof and plate. Fig. 4 is a horizontal section through the plate and weight where the same are secured together, section being made at the line 4 4 on Fig. 1. Fig. 5 is a vertical section from front to rear through a toe-weight having the hook at the lower end detachable. Fig. 6 is a section at the line 6 6 on Fig. 5. Fig. 7 is a perspective of a modified form of the weight-retaining spur.

A represents the hoof of the horse.

B is the toe-weight.

C is a plate secured to the hoof, and to which the toe-weight is secured. The plate C is a plate of metal, which is thin, except as to the pyramidal boss C' at its center. It may be concave on the rear side to fit the forward surface of the hoof. It is provided with screw-holes c about midway in its width from upper to lower edge, the same being located near the lateral edges, respectively, through which screws are inserted into the hoof to secure the plate thereto.

The boss C' is preferably made, as described and illustrated, of pyramidal shape, for reasons which will hereinafter be stated. At the center it has the screw-hole c', into which the screw D passes, and thereby secures the toe-weight to said plate. The toe-weight B is in general of the usual exterior shape—that is to say, substantially an oval segment—but it is distinguished by broadening and thickening at the lower part, so as to have very much the greater portion of its weight below its central line. Its rear surface is concaved to correspond with the shape of the hoof and the shape of the plate C, and in addition it has the recess B' to receive the plate C, said recess being in depth equal to the thickness of that plate, so that the rear surface of the plate is flush with the rear surface of the weight. In the center of the recess B' there is the farther recess B² of pyramidal shape, corresponding to and receiving the pyramidal boss C' of the plate C. The toe-weight is further pierced at the center of said pyramidal recess B by the hole B³, through which the screw D is inserted into the center of the boss C' of the plate C, as described. From the lower edge of the rear concave surface of the weight B the spur or hook B⁴ protrudes rearward and enters between the hoof A and the shoe A'.

An objection and inconvenience found in toe-weights now in use arise from the danger of their being thrown off of the hoof of the horse while trotting at high speed, and this danger arises largely from the fact that since the attachment to the hoof cannot be made by screws entering the latter, except comparatively near the lower edge, without danger of injuring the hoof, so much of the toe-weight as is above the point at which the screws are thus inserted acts with a centrifugal force when the foot of the horse is brought down in stepping, and so tends to wrench the screws out from the hoof and detach the weight and plate together, often to the great injury of the animal. This difficulty is reduced to the minimum degree possible in my construction by shaping the toe-weight so that very much the greater portion of its weight is below the point at which the screws c are inserted, so that the centrifugal force which would wrench them out is the slightest possible. Furthermore, the tendency to loosen either the screws c in the hoof or the screw D in the plate which would result if there were even the slightest play of the weight on the plate is prevented by the taper of the boss C' and the corresponding shape of the recess B², which receives it in the toe-weight, these tapering sides permitting the screw D to bind the weight securely upon the plate, and making it possible always to set it tight thereon, even after long use may have reduced the size of the boss or enlarged the recess. Another advantage of the boss formed on the plate is that thereby the screw D obtains very secure hold, the amount of metal for the thread being much greater than could be allowed without that construction, since it is desirable that the plate itself, aside from the boss, should be as light as possible, so that when the weight is removed in the intervals of trotting the horse shall be as nearly as possible free from artificial weight. The same reason makes it advantageous that the hook $B^4$ is formed on the weight instead of on the plate.

It is often desirable to apply a toe-weight experimentally only to a hoof which has a shoe not adapted to permit the insertion of the hook $B^4$. For convenience in such cases, the toe-weight may be made with the spur or hook detachable, as shown in Figs. 5 and 6, so that the weight may be temporarily secured to the hoof without the hook. I prefer in such case that the hook be fastened to the weight in the manner shown in Figs. 5 and 6, a dovetail notch being made in the lower edge of the weight and the head of the hook shaped to correspond to said notch—i. e., wider at the upper than at the lower surface—and a screw-hole being made through such head and in the lower edge of the weight, by means of which the screw $b^4$ may be used to further secure the weight and hook together. The use of the screw $b^4$ is not a necessity, since the dovetail joint described prevents the separation of the weight and spur, except by the same sort of movement as would tend to draw the spur out from in under the hoof. This is especially true, and the screw is, in fact, entirely unnecessary if the notch $b$ be cut wider at the forward end than at the rear, as well as wider at the top than at the bottom, thus making a double dovetail, the head of the spur being then similarly shaped, as shown in Fig. 7.

I claim—

A toe-weight for horses, consisting of a plate having screw-holes by means of which it may be secured to the hoof, and having a tapering boss protruding from its outer surface, and a weight having the greater portion of its substance below the medial line, and provided with a cavity in its rear side fitted to receive the plate, and a farther recess in said cavity tapered to fit the boss, and having a spur or hook protruding from its extreme lower edge rearward and adapted to pass underneath the hoof, and a screw inserted through the weight from the forward side and entering the center of the boss in the plate to secure them together, substantially as set forth.

In testimony whereof I have hereunto set my hand, in the presence of two witnesses, at Chicago, this 4th day of December, A. D. 1888.

JOHN CLARK.

Witnesses:
CHAS. S. BURTON,
JEAN ELLIOTT.